Nov. 1, 1932.         L. G. HENNING ET AL         1,886,015
                  FIXTURE FOR HOLDING BIRD FOOD
                       Filed Jan. 12, 1931
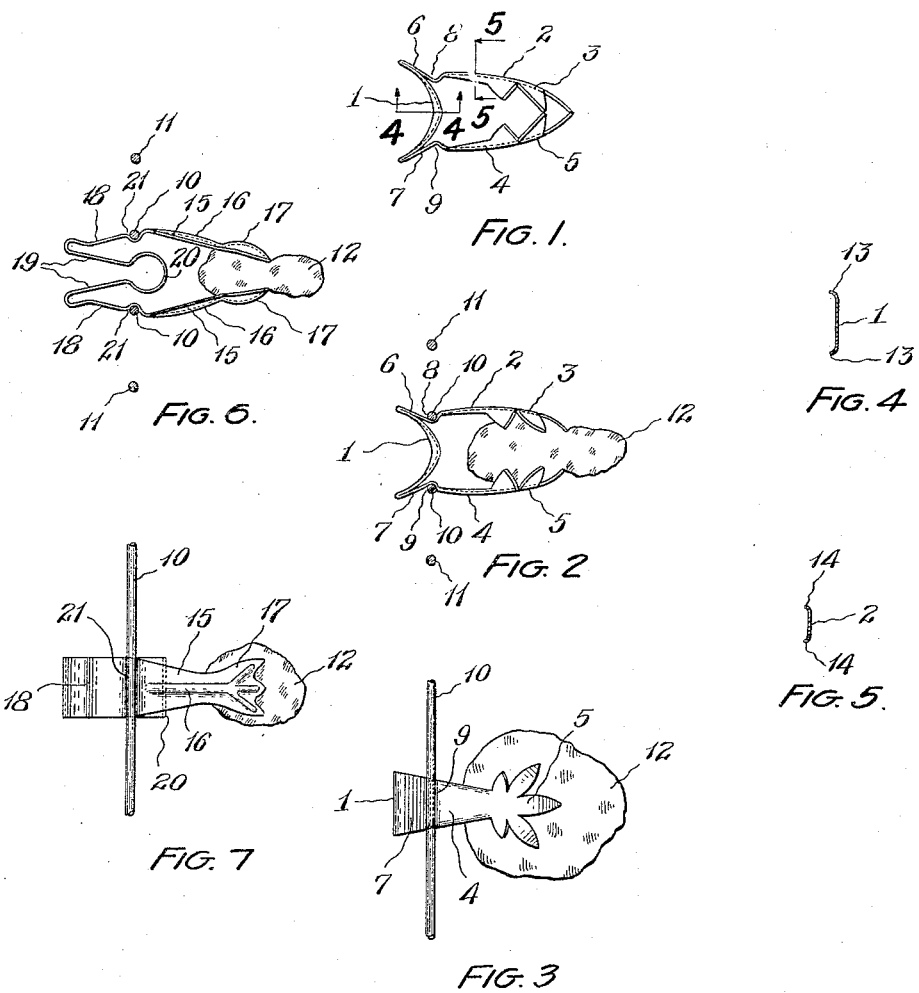
INVENTORS:
LESLIE G. HENNING
AND JOHN REIN
BY George W. Saywell
              ATTORNEY Patented Nov. 1, 1932

1,886,015

UNITED STATES PATENT OFFICE

LESLIE G. HENNING, OF LAKEWOOD, AND JOHN REIN, OF CLEVELAND, OHIO, ASSIGNORS TO THE H & R SALES COMPANY, OF CLEVELAND, OHIO, A CORPORATION OF OHIO

FIXTURE FOR HOLDING BIRD FOOD

Application filed January 12, 1931. Serial No. 508,187.

Our invention particularly relates to fixtures of the above-mentioned character which are adaptable for mounting upon the spaced parallel vertical bars of an ordinary bird cage and for holding bird food of a solid nature, such as bone, cake, etc. The purposes of the invention are to devise a fixture of this nature which may be economically manufactured, which will resiliently hold the bird food and can be operated without becoming disengaged from the bird cage bars or loosening thereon, which will not readily break, due to the spring action to which it is subjected, and which may be readily mounted upon and removed from the bird cage.

The annexed drawing and the following description set forth in detail certain means exemplifying our invention, such disclosed means constituting, however, but two of the forms in which the principle of the invention may be embodied.

In said annexed drawing:

Figure 1 is a plan view of one form of our improved fixture in normal inoperative position;

Figure 2 is a plan view of the fixture shown in Figure 1 mounted upon adjacent parallel bars of a bird cage and holding a body of bird food, two additional spaced parallel cage bars being shown for purposes of illustration;

Figure 3 is an elevation of the elements shown in Figure 2;

Figures 4 and 5 are vertical sections, taken, respectively, in the planes indicated by the lines 4—4 and 5—5, Figure 1; and Figures 6 and 7 are a plan view and an elevation, respectively, of a second form of our improved fixture mounted upon adjacent parallel bars of a bird cage and holding a body of bird food.

Referring to the annexed drawing, in which the same parts are indicated by the same respective numbers in the several views, the improved fixture, shown in Figures 1 to 5, inclusive, comprises a body member 1 and spaced opposed arms 2 and 4 extended from the body member at an acute angle and having outer end claw portions 3 and 5. The arms 2 and 4 are of resilient material so as to retain therebetween a body 12 of bird food. Preferably, the whole fixture is a one-piece member, of band-like or ribbon spring material. In order that the bending to which the fixture is subjected may not cause the breaking of the same, due to the crystallization of the spring material, we preferably reinforce the edges of the body member 1 by the flanges 13, Figure 4, and reinforce the central portions of the arms 2 and 4 by the upper and lower flanges 14, Figure 5.

As stated, the fixture is designed to be mounted upon the spaced bars of an ordinary bird cage. Two such adjacent bars are indicated by the number 10, Figure 2, and two other adjacently exterior bars 11 are indicated, for the purpose of clearly indicating the relative arrangement of the bird-cage bars. The body member 1 is of concavo-convex formation, and the arms 2 and 4 are extended outwardly at an acute angle from the convex portion of the body member 1, these arms 2 and 4 having portions 6 and 7, respectively, which diverge only slightly from the adjacent areas of the body member 1, and then the succeeding portions of the arms 2 and 4 diverge sharply from the body member 1 and the portions 6 and 7, as clearly shown in Figure 1. These sharply diverging portions of the arms 2 and 4 are concavo-convex and are spaced apart at the ends opposite the claw ends a distance slightly greater than the distance between two adjacent cage bars 10. In that section of the arms 2 and 4 where the differently diverging portions of the arms 2 and 4 meet, are formed grooves 8 and 9 adapted to engage with two of the spaced cage bars, such engagement being shown in Figure 2 wherein two adjacently spaced parallel bars 10 are engaged by the grooves 8 and 9, the latter being illustrated in the accompanying drawing as formed in the outer surfaces of the arms 2 and 4.

From the aforegoing description and upon reference to the accompanying drawing, it is evident that when the fixture is mounted between two adjacent bird cage bars 10, the spring arm portions 6 and 7 will hold the fixture against the bars 10, these bars 10 acting as axes about which the grooved arm portions 8 and 9 rotate. These grooved portions 8 and 9 are so disposed that the relative distance between them does not change when pressure is applied to the spring portion 6 and 7. It will be understood that a body of bird food 12 is gripped between the claws 3 and 5 before the fixture is thus mounted upon the cage, the claws 3 and 5 being spread to permit the insertion of the food 12 therebetween by pinching inwardly with the fingers upon the arm portions 6 and 7.

In the form of device shown in Figures 6 and 7, we have provided opposed arm members 15 having outwardly extended strengthening ribs 16 which extend into the claw parts 17 into which the outer ends of the arms 15 are formed. The ends of the arms 15 opposite the claw ends 17 are formed into opposed reentrant spring members 18—19 which merge into a resilient central curved member 20, clearly shown in Figure 6, this member 20 forming almost a complete circle and the opposed reentrant members 19 diverging therefrom. This form of fixture is also formed with grooves 21 adapted to accommodate opposed cage bars 10 serving as supports for the fixture and as axes about which the grooved portions 21 may rotate. In the normal inoperative position of the fixture, the claw ends 17 are closed and they can be separated to receive the body of bird food 12 by pressing inwardly upon the spring portions 18, and then the fixture with its retained food 12 can be mounted upon the cage bars 10.

What we claim is:

1. A fixture for holding bird food, adaptable for mounting upon a cage having spaced bars, comprising a flexible central body member, opposed spring members extending at an angle from said body member, and converging opposed claws extended from said spring members, the connecting portions of said spring members and claws being formed into grooved sections adapted to accommodate bird-cage bars and to rotate about said bars.

2. A fixture for holding bird food, adaptable for mounting upon a cage having spaced bars, comprising a body member, and opposed resilient arms extended at an angle from the body member and having outer end claw portions, intermediate sections of the arms being grooved for respective engagement with the cage bars and adapted to rotate on said bars, said arms adjacently exterior of said grooved sections being concavo-convex and spaced apart a distance greater than the distance between the opposed grooved sections.

3. A one-piece fixture of band-like material for holding bird food and adaptable for mounting upon a cage having spaced bars, comprising opposed claw ends, and a central spring member consisting of opposed reentrant arms connected at their inner ends by an arcuate spring section, the joints between said claw ends and said spring arms being formed into exterior grooves adapted to accommodate the cage bars and to rotate about said bars.

4. A one-piece fixture of flexible band-like material for holding bird food and adaptable for mounting upon a cage having spaced bars, comprising a concavo-convex central body member, opposed concavo-convex end arms, intermediate members connecting the ends of said body member and said arms and diverging at only a slight angle from the body member, said arms having terminal food-gripping claws, the fixture being formed with exterior grooves at the respective points between said arms and said intermediate members for engagement with spaced cage bars, and the portions of said arms immediately exterior of said grooves being spaced apart a distance greater than the distance between the opposed grooves.

Signed by us this 5th day of December, 1930.

LESLIE G. HENNING.
JOHN REIN.